United States Patent
Chen et al.

(10) Patent No.: US 10,176,329 B2
(45) Date of Patent: Jan. 8, 2019

(54) SYSTEMS AND METHODS FOR DETECTING UNKNOWN VULNERABILITIES IN COMPUTING PROCESSES

(71) Applicant: Symantec Corporation, Mountain View, CA (US)

(72) Inventors: Joseph Chen, Los Angeles, CA (US); Rei Kristian Resurreccion, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 309 days.

(21) Appl. No.: 14/822,930

(22) Filed: Aug. 11, 2015

(65) Prior Publication Data
US 2017/0046518 A1   Feb. 16, 2017

(51) Int. Cl.
*G06F 21/57* (2013.01)
*G06F 21/55* (2013.01)
(Continued)

(52) U.S. Cl.
CPC ............ *G06F 21/577* (2013.01); *G06F 21/54* (2013.01); *G06F 21/552* (2013.01); *G06F 21/566* (2013.01); *G06F 21/568* (2013.01); *H04L 63/1433* (2013.01); *G06F 2221/033* (2013.01); *G06F 2221/034* (2013.01); *G06F 2221/2149* (2013.01)

(58) Field of Classification Search
CPC .................................................. G06F 21/577
USPC ......................................................... 726/25
See application file for complete search history.

(56) References Cited

U.S. PATENT DOCUMENTS

2007/0180509 A1   8/2007   Swartz et al.
2009/0077664 A1   3/2009   Hsu et al.
(Continued)

OTHER PUBLICATIONS

Andrew Watson, et al.; Systems and Methods for Identifying Detection-Evasion Behaviors of Files Undergoing Malware Analyses; U.S. Appl. No. 14/567,440, filed Dec. 11, 2014.
(Continued)

*Primary Examiner* — Jacob Lipman
(74) *Attorney, Agent, or Firm* — Fisher Broyles, LLP

(57) ABSTRACT

The disclosed computer-implemented method for detecting unknown vulnerabilities in computing processes may include (1) monitoring a computing environment that facilitates execution of a computing process by logging telemetry data related to the computing process while the computing process is running within the computing environment, (2) determining that the computing process crashed while running within the computing environment, (3) searching the telemetry data for evidence of any vulnerabilities that potentially led the computing process to crash while running within the computing environment, (4) identifying, while searching the telemetry data, evidence of at least one vulnerability of the computing process that is not yet known to exist within the computing process and then in response to identifying the evidence of the computing process's vulnerability, (5) performing at least one security action to hinder any potentially malicious exploitation of the computing process's vulnerability. Various other methods, systems, and computer-readable media are also disclosed.

14 Claims, 5 Drawing Sheets

(51) Int. Cl.
   *G06F 21/56*     (2013.01)
   *G06F 21/54*     (2013.01)
   *H04L 29/06*     (2006.01)

(56) References Cited

U.S. PATENT DOCUMENTS

| | | | |
|---|---|---|---|
| 2012/0110344 A1* | 5/2012 | Sadovsky | G06F 11/0778 713/189 |
| 2012/0317647 A1* | 12/2012 | Brumley | G06F 21/00 726/25 |
| 2013/0111587 A1* | 5/2013 | Goel | G06F 21/577 726/23 |
| 2016/0294800 A1* | 10/2016 | Oppenheim, Jr. | H04L 63/08 |
| 2016/0352608 A1* | 12/2016 | Cornell | H04L 43/10 |

OTHER PUBLICATIONS

Alexander Danileiko; Systems and Methods for Thwarting Unauthorized Attempts to Disable Security Managers Within Runtime Environments; U.S. Appl. No. 14/822,927, filed Aug. 11, 2015.

"Hooking", https://en.wikipedia.org/wiki/Hooking, as accessed Jul. 22, 2015, Wikipedia, (Dec. 15, 2005).

"Exception handling", https://en.wikipedia.org/wiki/Exception handling, as accessed Jul. 22, 2015, Wikipedia, (Jul. 10, 2004).

"Zero-day (computing)", https://en.wikipedia.org/wiki/Zero-day_(computing), as accessed Jul. 22, 2015, Wikipedia, (Jun. 14, 2015).

"FireEye", https://www.fireeye.com/, as accessed Jul. 22, 2015, (Oct. 12, 1999).

* cited by examiner

SYSTEMS AND METHODS FOR DETECTING UNKNOWN VULNERABILITIES IN COMPUTING PROCESSES

BACKGROUND

Computer security systems often monitor computing devices for potential security threats. For example, a computing device may implement a traditional computer security system to protect against potential security threats. In this example, the traditional computer security system may be able to detect the presence of well-known security threats. Unfortunately, while this traditional computer security system may be able to detect the presence of well-known security threats, the traditional computer security system may have difficulty detecting the presence of unknown security threats (e.g., zero-day attacks and/or files encountered on only one computer within the computer security system's user base).

Security threats often infiltrate computing devices by way of vulnerabilities that exist within computing processes running on these computing devices. For example, a computing device may install and/or launch a newly released computing process (such as an operating system update, a software application, and/or a development tool). Unfortunately, this newly released computing process may fail to account for certain exceptions and/or errors that occur during execution. These exceptions and/or errors may represent vulnerabilities of the computing process that malicious attackers are able to exploit for the purpose of infecting, attacking, and/or gaining control over the computing device.

The instant disclosure, therefore, identifies and addresses a need for additional and improved systems and methods for detecting unknown vulnerabilities in computing processes.

SUMMARY

As will be described in greater detail below, the instant disclosure describes various systems and methods for detecting unknown vulnerabilities in computing processes by searching for certain patterns within telemetry data collected after such computing processes have crashed.

In one example, a computer-implemented method for detecting unknown vulnerabilities in computing processes may include (1) monitoring a computing environment that facilitates execution of a computing process by logging telemetry data related to the computing process while the computing process is running within the computing environment, (2) determining that the computing process crashed while running within the computing environment, (3) searching the telemetry data for evidence of any vulnerabilities that potentially led the computing process to crash while running within the computing environment, (4) identifying, while searching the telemetry data, evidence of at least one vulnerability of the computing process that is not yet known to exist within the computing process and then in response to identifying the evidence of the computing process's vulnerability, (5) performing at least one security action to hinder any potentially malicious exploitation of the computing process's vulnerability.

In one example, the method may also include logging the telemetry data with an Application Programming Interface (API) hook, a packet capture component, a file system monitor, and/or a network switch. In this example, the method may further include inserting a hook within an API that is commonly called during malicious attacks. Additionally or alternatively, the method may include inserting a hook within a code path that leads to an API that is commonly called during malicious attacks.

In one example, the method may also include detecting an overflow of a call stack within the computing environment while the computing process is running within the computing environment. Additionally or alternatively, the method may include determining that the computing process has thrown an exception while running within the computing environment.

In one example, the method may also include determining, based at least in part on the telemetry data, that an exception handler on a call stack within the computing environment was overwritten while the computing process was running within the computing environment. Additionally or alternatively, the method may include determining, based at least in part on the telemetry data, that a virtual address of the computing process on a call stack within the computing environment was overwritten while the computing process was running within the computing environment.

In one example, the method may also include determining that the vulnerability is not yet known to exist within the computing process. For example, the method may include querying a database that identifies known vulnerabilities of certain computing processes and then determining, based at least in part on the query, that the database does not identify the computing process as having the vulnerability.

Examples of the telemetry data include, without limitation, a crash dump, a call stack of the computing environment (such as the call stack involved in the crash of the computing process), an API trace, environmental context information, variations of one or more of the same, combinations of one or more of the same, or any other suitable telemetry data. Examples of the security action include, without limitation, notifying a vendor of the computing process about the computing process's vulnerability, adding a record of the computing process's vulnerability to a database that identifies known vulnerabilities of certain computing processes, modifying a computer security system to monitor for any attempts to exploit the computing process's vulnerability, variations of one or more of the same, combinations of one or more of the same, or any other suitable security action.

As another example, a system for implementing the above-described method may include (1) a monitoring module, stored in memory, that (A) monitors a computing environment that facilitates execution of a computing process by logging telemetry data related to the computing process while the computing process is running within the computing environment and (B) determines that the computing process crashed while running within the computing environment, (2) an analysis module, stored in memory, that (A) searches the telemetry data for evidence of any vulnerabilities that potentially led the computing process to crash while running within the computing environment and (B) identifies, while searching the telemetry data, evidence of at least one vulnerability of the computing process that is not yet known to exist within the computing process, (3) a security module, stored in memory, that performs at least one security action to hinder any potentially malicious exploitation of the computing process's vulnerability in response to the identification of the evidence, and (4) at least one physical processor that executes a monitoring module, an analysis module, and a security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor a computing environment that facilitates execution of a computing process by logging telemetry data related to the computing process while the computing process is running within the computing environment, (2) determine that the computing process crashed while running within the computing environment, (3) search the telemetry data for evidence of any vulnerabilities that potentially led the computing process to crash while running within the computing environment, (4) identify, while searching the telemetry data, evidence of at least one vulnerability of the computing process that is not yet known to exist within the computing process and then in response to identifying the evidence of the computing process's vulnerability, (5) perform at least one security action to hinder any potentially malicious exploitation of the computing process's vulnerability.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
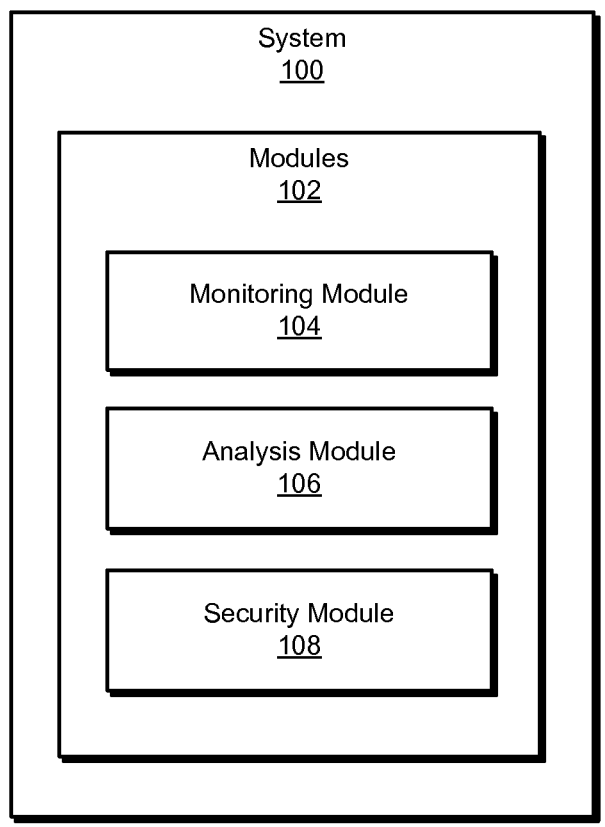
FIG. 1 is a block diagram of an exemplary system for detecting unknown vulnerabilities in computing processes.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting unknown vulnerabilities in computing processes. As will be explained in greater detail below, by analyzing telemetry data (e.g., crash dumps, call stacks, API traces, and/or environmental context information) collected from a computing device after a process crash, the systems and methods described herein may be able to identify certain patterns within the telemetry data that are indicative of vulnerabilities. The systems and methods described herein may also determine whether such vulnerabilities are known to exist within the process that crashed on the computing device.

In the event that the vulnerabilities are not known to exist within the process that crashed, the systems and methods described herein may perform security actions to prevent malicious attackers from exploiting any of those vulnerabilities for the purpose of infecting, attacking, and/or gaining control over the computing device. Accordingly, the systems and methods described herein may facilitate detecting and/or discovering unknown vulnerabilities (sometimes also referred to as "zero-day vulnerabilities") before those vulnerabilities are detected and/or discovered by malicious attackers. As a result, the systems and methods described herein may be able to address those vulnerabilities in advance to ward off future zero-day attacks by malicious attackers who attempt to exploit those vulnerabilities.

Figure 2:
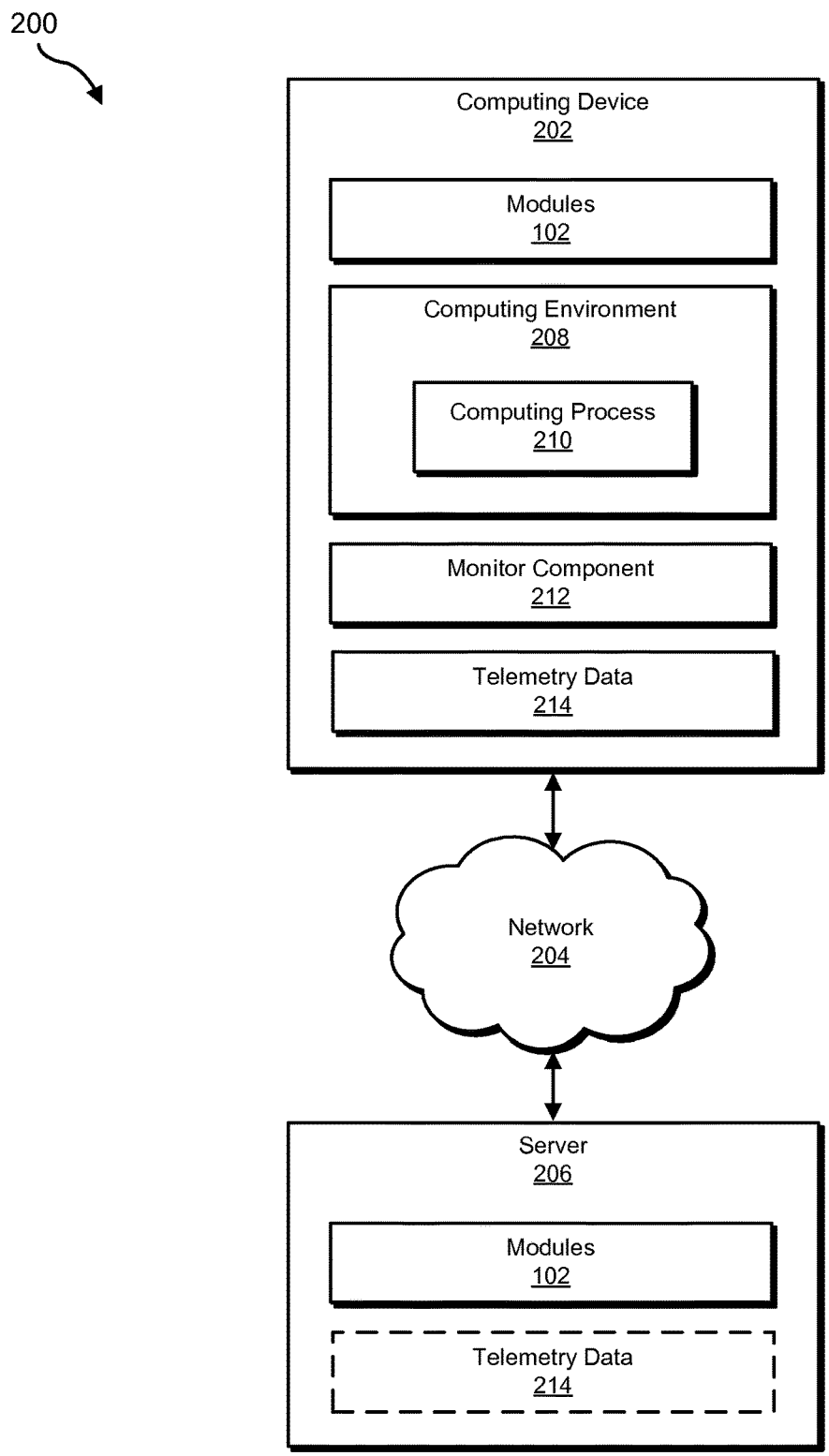
FIG. 2 is a block diagram of an additional exemplary system for detecting unknown vulnerabilities in computing processes.

The following will provide, with reference to FIGS. 1-2, detailed descriptions of exemplary systems for detecting unknown vulnerabilities in computing processes. Detailed descriptions of corresponding computer-implemented methods will be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting unknown vulnerabilities in computing processes. As illustrated in this figure, exemplary system 100 may include one or more modules 102 for performing one or more tasks. For example, and as will be explained in greater detail below, exemplary system 100 may include a monitoring module 104 that (1) monitors a computing environment that facilitates execution of a computing process by logging telemetry data related to the computing process while the computing process is running within the computing environment and (2) determines that the computing process crashed while running within the computing environment.

In addition, and as will be described in greater detail below, exemplary system 100 may include an analysis module 106 that (1) searches the telemetry data for evidence of any vulnerabilities that potentially led the computing process to crash while running within the computing environment and (2) identifies, while searching the telemetry data, evidence of at least one vulnerability of the computing process that is not yet known to exist within the computing process. Exemplary system 100 may also include a security module 108 that performs at least one security action to hinder any potentially malicious exploitation of the computing process's vulnerability in response to the identification of the evidence. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102. In this example, computing device 202 may include and/or represent a computing environment 208 that facilitates the execution of a computing process 210. Additionally or alternatively, computing device 202 may include and/or maintain a monitor component 212 that logs and/or collects telemetry data 214 in connection with computing environment 208 and/or computing process 210.

Although computing environment 208 is illustrated as being separate from computing device 202 in FIG. 2, computing device 202 may alternatively constitute and/or represent computing environment 208. Similarly, although monitor component 212 is illustrated as being separate from computing environment 208 in FIG. 2, monitor component 212 may alternatively constitute and/or represent part of computing environment 208 in FIG. 2 and/or a component specific or related to computing environment 208.

Moreover, although FIG. 2 illustrates only one monitor component, system 200 may alternatively include and/or involve numerous monitor components that log, collect, and/or record portions of telemetry data 214. Similarly, although FIG. 2 illustrates only one computing process running within computing environment 208, system 200 may alternatively include and/or involve numerous computing processes running simultaneously within computing environment 208.

In one example, server 206 may be programmed with one or more of modules 102. In this example, server 206 may obtain telemetry data 214 from computing device 202 via network 204. Additionally or alternatively, server 206 may analyze telemetry data 214 to determine whether computing process 210 has crashed due at least in part to any vulnerabilities that are not yet known to exist within computing process 210.

In one embodiment, one or more of modules 102 from FIG. 1 may, when executed by at least one processor of computing device 202 and/or server 206, enable computing device 202 and/or server 206 to detect unknown vulnerabilities in computing processes. For example, and as will be described in greater detail below, one or more of modules 102 may cause computing device 202 and/or server 206 to (1) monitor computing environment 208 that facilitates execution of computing process 210 by logging telemetry data 214 related to computing process 210 while computing process 210 is running within computing environment 208, (2) determine that computing process 210 crashed while running within computing environment 208, (3) search telemetry data 214 for evidence of any vulnerabilities that potentially led computing process 210 to crash while running within computing environment 208, (4) identify, while searching telemetry data 214, evidence of at least one vulnerability of computing process 210 that is not yet known to exist within computing process 210 and then in response to identifying the evidence of the computing process's vulnerability, (5) perform at least one security action to hinder any potentially malicious exploitation of the computing process's vulnerability.

Computing device 202 generally represents any type or form of computing device capable of reading computer-executable instructions. Examples of computing device 202 include, without limitation, laptops, tablets, desktops, servers, cellular phones, Personal Digital Assistants (PDAs), network devices, multimedia players, embedded systems, wearable devices (e.g., smart watches, smart glasses, etc.), gaming consoles, combinations of one or more of the same, exemplary computing system 410 in FIG. 4, or any other suitable computing device.

Computing environment 208 generally represents any type or form of physical or virtual computing environment, tool, platform, and/or engine that facilitates the execution and/or launching of computing processes. Examples of computing environment 208 include, without limitation, software applications, operating systems, sandboxes, runtime environments, virtual machines, physical computing devices (such as computing device 202), variations of one or more of the same, combinations of one or more of the same, or any other suitable computing environment.

Computing process 210 generally represents any type or form of application, program, and/or process capable of running within and/or in connection with a computing environment. In one example, computing process 210 may include and/or represent a new application, update, and/or patch recently released to users. For example, computing process 210 may include and/or represent a beta version of an operating system. Examples of computing process 210 include, without limitation, software applications, operating systems, applets, computer games, communication software, networking software, variations of one or more of the same, updates of one or more of the same, combinations of one or more of the same, or any other suitable computing process.

Monitor component 212 generally represents any type or form of device, program, code, and/or mechanism that monitors, observes, and/or logs computing activity and/or telemetry data in connection with a computing process running within a computing environment. In one example, monitor component 212 may represent part of monitoring module 104. In another example, monitor component 212 may be separate and distinct from monitoring module 104. For example, monitoring module 104 may insert and/or embed monitor component 212 within an API commonly called during malicious attacks and/or within a code path that leads to such an API. Examples of monitor component 212 include, without limitation, hooks, packet capture components, file system monitors, network switches, variations of one or more of the same, combinations of one or more of the same, or any other suitable monitor component.

The term "hook," as used herein, generally refers to any type or form of modification and/or augmentation of code that facilitates intercepting and/or recording calls to an API. In one example, a hook may include and/or represent a modification and/or augmentation to an API that at least temporarily transfers the flow of execution from the original version of the API to another memory location and/or alternative code. For example, a hook may include and/or represent code (e.g., a jump instruction) inserted at the beginning or entry point of an API. In this example, the code (sometimes referred to as a "trampoline") may temporarily transfer or divert the flow of execution from the API to another memory location where additional code is configured to log telemetry data related to the computing process that initiated the call to the API. By logging the telemetry data in this way, the additional code may be able to collect and/or maintain such telemetry data for analysis in the event that the computing process that initiated the API call ultimately and/or unexpectedly crashes. Examples of such hooks include, without limitation, API hooks, user mode hooks, kernel mode hooks, physical-modification hooks, runtime-modification hooks, event hooks, virtual hooks, netfilter hooks, variations of one or more of the same, combinations of one or more of the same, or any other suitable hooks.

Telemetry data 214 generally represents any type or form of data, statistics, and/or information related to a computing process. In one example, telemetry data 214 may provide insight into whether computing process 210 crashed as a result of a vulnerability. Additionally or alternatively, telemetry data 214 may identify and/or indicate certain computing activity observed by computing environment 208 and/or computing device 202 leading up to the crash. Examples of telemetry data 214 include, without limitation, crash dumps, memory dumps, call stacks (such as the call stack involved in a process crash), API traces, environmental context information, variations of one or more of the same, combinations of one or more of the same, or any other suitable telemetry data.

Server 206 generally represents any type or form of computing device capable of performing vulnerability analyses on telemetry data and/or observing computing activity in connection with malware analyses. Examples of server 206 include, without limitation, application servers, security servers, web servers, storage servers, deduplication servers, and/or database servers configured to run certain software applications and/or provide various security, web, storage, deduplication, and/or database services.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
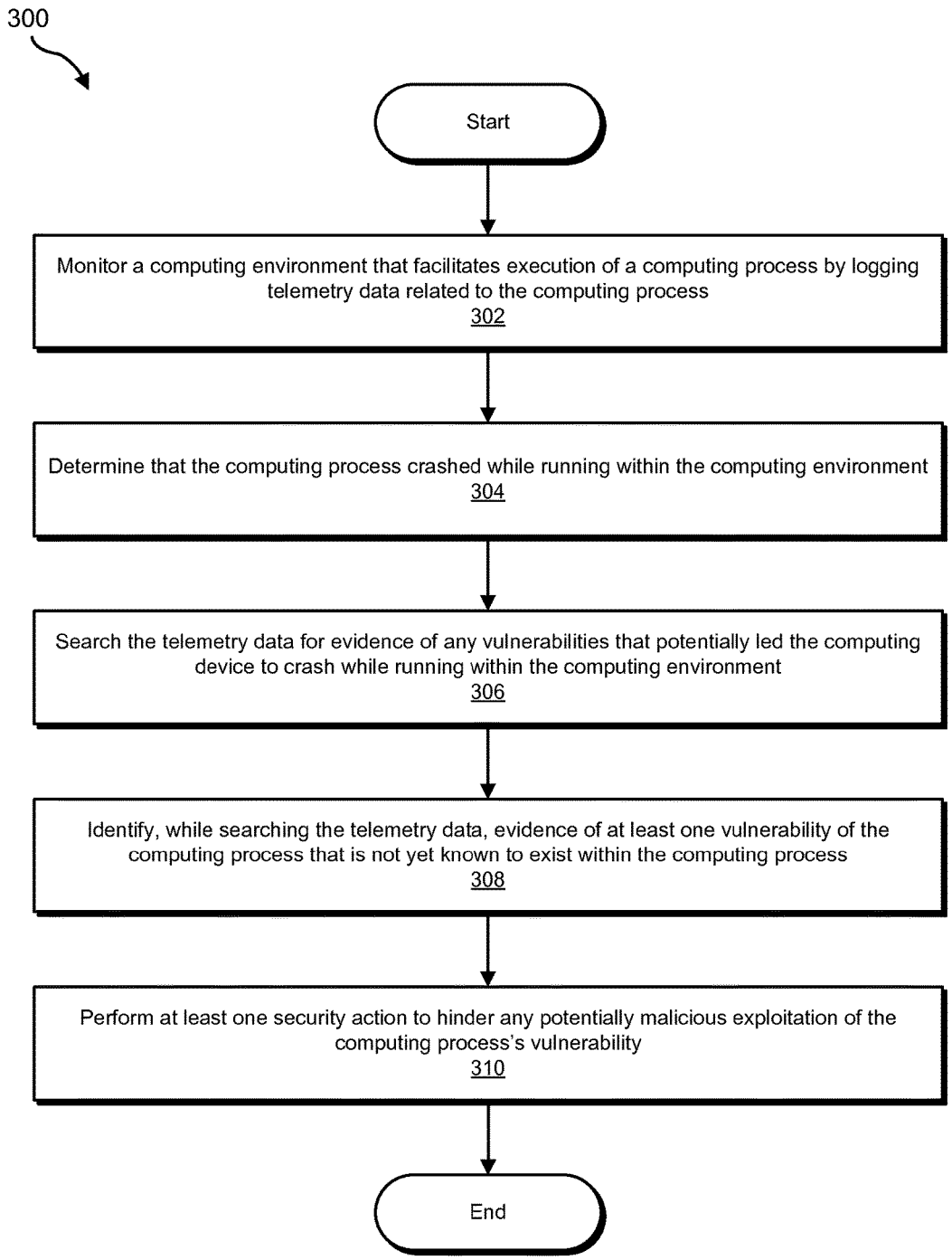
FIG. 3 is a flow diagram of an exemplary method for detecting unknown vulnerabilities in computing processes.

FIG. 3 is a flow diagram of an exemplary computer-implemented method 300 for detecting unknown vulnerabilities in computing processes. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may monitor a computing environment that facilitates execution of a computing process by logging telemetry data related to the computing process while the computing process is running within the computing environment. For example, monitoring module 104 may, as part of computing device 202 and/or server 206 in FIG. 2, monitor computing environment 208 that facilitates execution of computing process 210. In this example, monitoring module 104 may log telemetry data 214 related to computing process 210 while computing process 210 is running within computing environment 208.

The systems described herein may perform step 302 in a variety of ways and/or contexts. In one example, monitoring module 104 may monitor computing environment 208 by logging at least a portion of telemetry data 214 with monitor component 212. For example, in the event that monitor component 212 represents a hook, monitoring module 104 may insert the hook within an API that is commonly called during exploit attacks. Additionally or alternatively, monitoring module 104 may insert the hook within a code path that leads to an API that is commonly called during exploit attacks.

In one example, monitoring module 104 may log at least a portion of telemetry data 214 by creating a crash dump and/or memory dump. In another example, monitoring module 104 may log at least a portion of telemetry data 214 by recording, copying, and/or duplicating a call stack of computing environment 208. For example, monitoring module 104 may identify which call stack of computing environment 208 was involved in a crash of computing process 210 and record the contents of the call stack leading up to the crash. In a further example, monitoring module 104 may log at least a portion of telemetry data 214 by tracing APIs called by computing process 210.

In one example, monitoring module 104 may monitor computing environment 208 by intercepting certain API calls made by computing processes running within computing environment 208. For example, monitoring module 104 may intercept all calls to an API commonly called by malware during exploit attacks. Additionally or alternatively, monitoring module 104 may intercept all calls to another API capable of leading to and/or resulting in the calling of the API commonly called by malware during exploit attacks. In other words, monitoring module 104 may monitor a commonly targeted API itself and/or any code paths that lead to the commonly targeted API.

Returning to FIG. 3, at step 304 one or more of the systems described herein may determine that the computing process crashed while running within the computing environment. For example, monitoring module 104 may, as part of computing device 202 and/or server 206 in FIG. 2, determine that computing process 210 crashed while running within computing environment 208. The term "crash" or the phrase "to crash," as used herein in connection with a computing process, generally refers to any type or form of abnormal termination and/or error that results in the computing process ceasing to function properly.

The systems described herein may perform step 304 in a variety of ways and/or contexts. In one example, monitoring module 104 may determine that computing process 210 crashed by adding a piece of code that detects crashes to computing process 210. For example, before computing process 210 begins running within computing environment 208, monitoring module 104 may add a piece of code to computing process 210. In this example, the piece of code may be configured to detect any abnormal terminations and/or certain errors and then report the same to monitoring module 104 and/or computing environment 208. Monitoring module 104 may then determine that computing process 210 has crashed based at least in part on the piece of code added to computing process 210.

Additionally or alternatively, monitoring module 104 may determine that computing process 210 crashed by detecting an overflow of a call stack and/or buffer within computing environment 208. For example, monitoring module 104 may monitor a call stack and/or buffer used by computing process 210 while running within computing environment 208. In this example, monitoring module 104 may detect an overflow of the call stack and/or buffer. Monitoring module 104 may then determine that computing process 210 has crashed since the call stack and/or buffer overflowed while computing process 210 was running within computing environment 208.

Additionally or alternatively, monitoring module 104 may determine that computing process 210 crashed based at least in part on an exception thrown and/or raised by computing process 210 while running within computing environment 208. The term "exception," as used herein, generally refers to any type or form of anomalous, unexpected, and/or unanticipated condition and/or computing state encountered and/or experienced by a computing process during execution. For example, monitoring module 104 may monitor the computing activity originating from computing process 210 while running within computing environment 208. While monitoring the computing activity originating from computing process 210, monitoring module 104 may detect an exception thrown and/or raised by computing process 210. Monitoring module 104 may then determine that computing process 210 has crashed since computing process 210 has thrown and/or raised the exception.

Returning to FIG. 3, at step 306 one or more of the systems described herein may search the telemetry data for evidence of any vulnerabilities that potentially led the computing process to crash while running within the computing environment. For example, analysis module 106 may, as part of computing device 202 and/or server 206 in FIG. 2, search telemetry data 214 for evidence of any vulnerabilities that potentially led computing process 210 to crash while running within computing environment 208. In this example, analysis module 106 may initiate this search in response to the determination that computing process 210 has crashed.

The term "evidence," as used herein, generally refers to any type or form of activity, behavior, occurrence, observation, data, and/or information that indicates or suggests the existence of a vulnerability. The term "vulnerability," as used herein, generally refers to any type or form of flaw, weakness, susceptibility, and/or defect in a computing process. In one example, a vulnerability may include and/or represent a software bug that is potentially exploitable by malicious attackers. Additionally and/or alternatively, a vulnerability may include and/or represent a coding oversight that exists within the code of a computing process.

The systems described herein may perform step 306 in a variety of ways and/or contexts. In some examples, analysis module 106 may search telemetry data 214 for certain patterns that are indicative and/or suggestive of a specific vulnerability. As an example, in the event that telemetry data 214 includes a crash dump, analysis module 106 may search the crash dump for a pattern that indicates and/or suggests that a call stack within computing environment 208 overflowed and an exception handler on the call stack was overwritten. For example, analysis module 106 may analyze the crash dump to determine whether a call stack that included the exception handler of computing process 210 overflowed and the exception handler was overwritten.

Additionally or alternatively, analysis module 106 may search the crash dump for a pattern that indicates and/or suggests that a call stack within computing environment 208 overflowed and a virtual address on the call stack was overwritten. For example, analysis module 106 may analyze the crash dump to determine whether a call stack that included a virtual address of computing process 210 overflowed and the virtual address was overwritten.

Returning to FIG. 3, at step 308 one or more of the systems described herein may identify evidence of at least one vulnerability of the computing process that is not yet known to exist within the computing process. For example, analysis module 106 may, as part of computing device 202 and/or server 206 in FIG. 2, identify evidence of at least one vulnerability of computing process 210 while searching telemetry data 214. In this example, the vulnerability may not yet be known to exist within computing process 210 prior to and/or at the time that analysis module 106 identified the evidence of the unknown vulnerability. The terms "unknown vulnerability" and "zero-day vulnerability," as used herein in connection with a computing process, generally refer to any type or form of vulnerability in the computing process that is currently unknown, undisclosed, and/or uncorrected.

The systems described herein may perform step 308 in a variety of ways and/or contexts. In some examples, analysis module 106 may determine that computing process 210 has the unknown vulnerability by identifying certain patterns within telemetry data 214. For example, analysis module 106 may identify a pattern that indicates and/or suggests that a call stack that included the exception handler of computing process 210 overflowed and the exception handler was overwritten. Analysis module 106 may then determine that computing process 210 has a certain vulnerability based at least in part on the identification of this pattern within telemetry data 214.

Additionally or alternatively, analysis module 106 may identify a pattern that indicates and/or suggests that a call stack that included a virtual address of computing process 210 overflowed and the virtual address was overwritten. Analysis module 106 may then determine that computing process 210 has a certain vulnerability based at least in part on the identification of this pattern within telemetry data 214.

In some examples, analysis module 106 may determine that the identified vulnerability is not yet known to exist within computing process 210. In other words, analysis module 106 may determine that the computing process's vulnerability is unknown and/or zero-day. In one example, analysis module 106 may query a database (not illustrated in FIG. 2) that identifies known vulnerabilities of certain computing processes. In this example, the database may include and/or represent a running list of vulnerabilities that are known to currently affect or to have previously affected a vast number of computing processes. Analysis module 106 may then determine that the database does not identify the computing process as having the identified vulnerability based at least in part on the query. As a result, analysis module 106 may determine that the computing process's vulnerability is unknown and/or zero-day.

Returning to FIG. 3, at step 310 one or more of the systems described herein may perform at least one security action to hinder any potentially malicious exploitation of the computing process's vulnerability. For example, security module 108 may, as part of computing device 202 and/or server 206 in FIG. 2, perform at least one security action to address the identified vulnerability of computing process 210. By performing the security action in this way, security module 108 may be able to effectively hinder any potentially malicious exploitation of the computing process's vulnerability. In other words, by performing the security action in this way, security module 108 may be able to prevent malicious attackers from exploiting the vulnerability for the purpose of infecting, attacking, and/or gaining control over any computing devices that are executing computing process 210.

The systems described herein may perform step 310 in a variety of ways and/or contexts. In one example, security module 108 may notify the developer and/or vendor of computing process 210 about the computing process's vulnerability. In another example, security module 108 may add a record of the computing process's vulnerability to a database that identifies known vulnerabilities of certain computing processes. Additionally or alternatively, security module 108 may modify a computer security system (e.g., an antivirus and/or antimalware solution) to monitor for any attempts to exploit the computing process's vulnerability and/or block such attempts.

As explained above in connection with FIGS. 1-3, the systems and methods described herein may be able to detect unknown and/or zero-day vulnerabilities in computing processes. By detecting such vulnerabilities, the systems and methods described herein may be able to preempt zero-day attacks that exploit those vulnerabilities. As an example, a computing device may install and/or launch a newly released computing process (such as an operating system update, a software application, and/or a development tool). Unfortunately, this newly released computing process may fail to account for certain exceptions and/or errors that occur during execution. These exceptions and/or errors may represent vulnerabilities of the computing process that, if known and/or discovered by malicious attackers, could potentially serve as exploits for the purpose of infecting, attacking, and/or gaining control over the computing device.

In an effort to preempt and/or prevent such exploitation, a computer security system may monitor computing processes executed by the computing device. For example, a security agent installed on the computing device may insert hooks into the code paths of APIs that are commonly used to exploit vulnerabilities. In this example, the hooks may collect and/or log certain telemetry data. In the event that the newly released computing process experiences a crash while running on the computing device, the security agent may send the telemetry data to a security server for analysis.

Upon receiving the telemetry data, the security server may analyze the telemetry data for certain patterns that suggest and/or indicate the presence of vulnerabilities. For example, the security server may analyze the telemetry data to determine whether a call stack that included the computing process's exception handler overflowed and the exception handler was overwritten. Additionally or alternatively, the security server may analyze the telemetry data to determine whether a call stack that included a virtual address of the computing process overflowed and the virtual address was overwritten. In the event that the analysis indicates the presence of a vulnerability, the security server may take remedial action to prevent malicious attackers from exploiting the vulnerability for the purpose of infecting, attacking, and/or gaining control over any computing devices that execute the newly released computing process.

Figure 4:
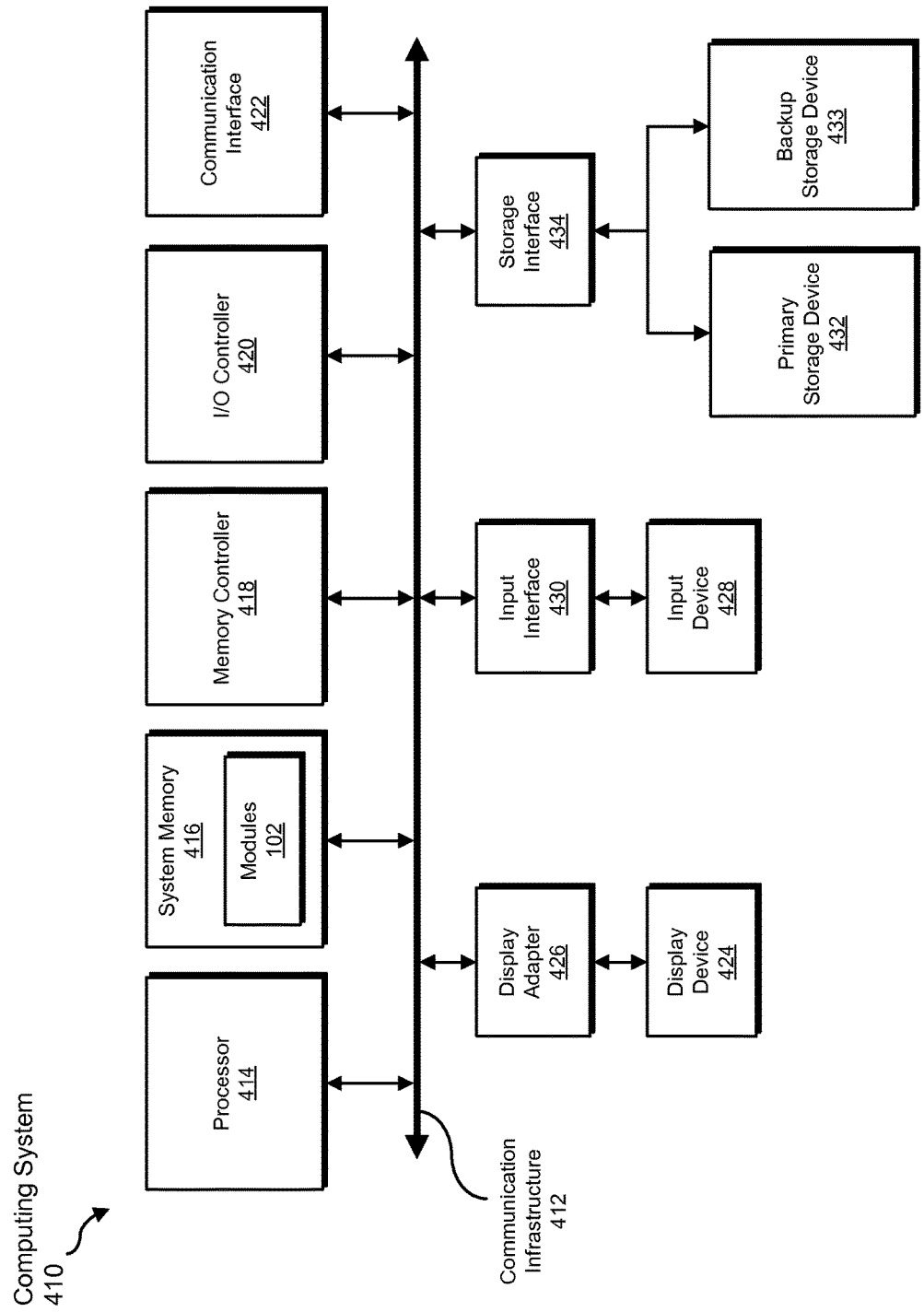
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
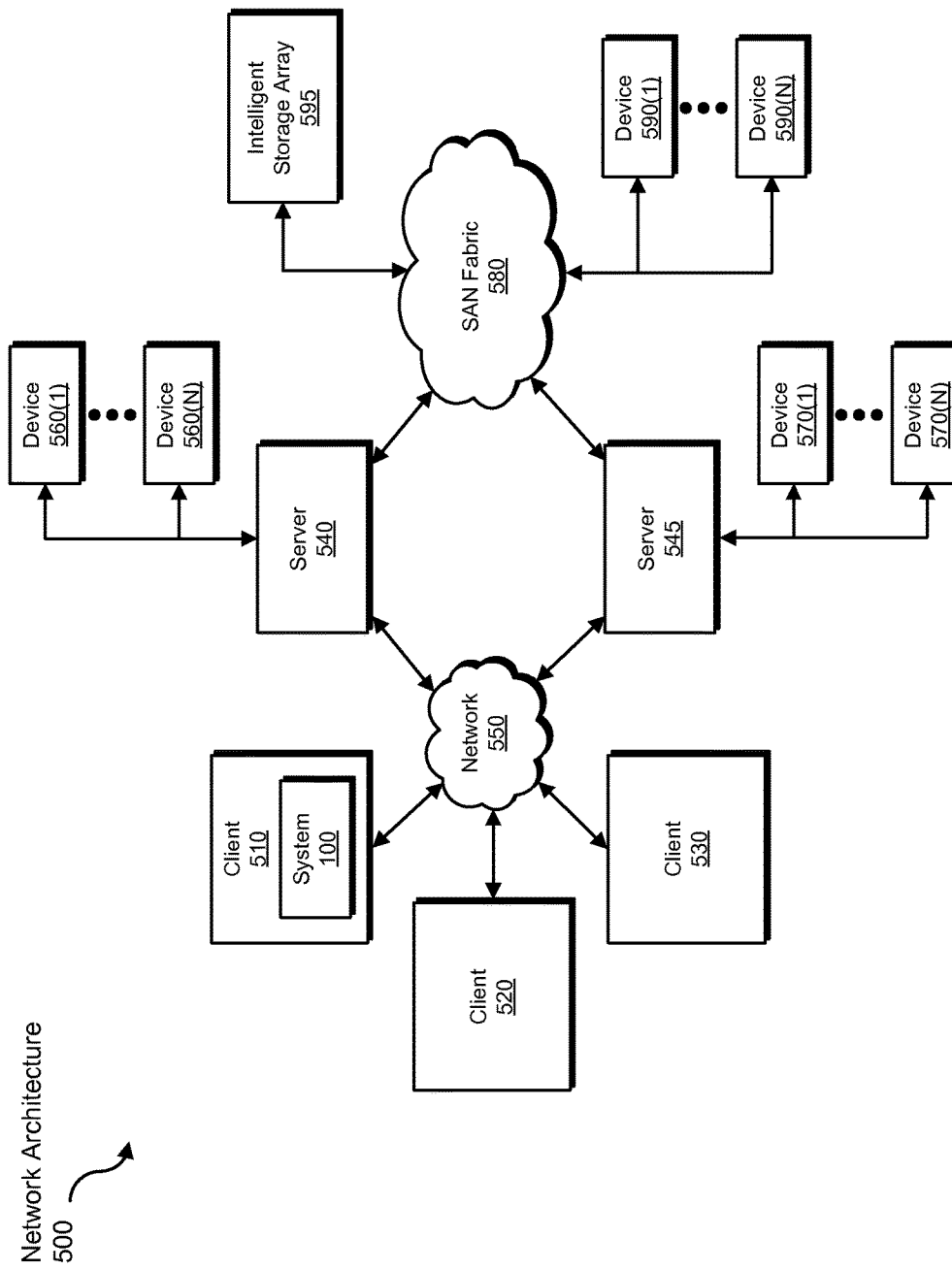
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for detecting unknown vulnerabilities in computing processes.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, antimalware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive telemetry data to be transformed, transform the telemetry data, output a result of the transformation to determine whether a computing process has a vulnerability, use the result of the transformation to address the vulnerability, and store the result of the transformation for future use and/or reference. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting unknown vulnerabilities in computing processes, at least a portion of the method being performed by a server comprising at least one processor, the method comprising:
    obtaining, by the server, telemetry data from a computing device on which a computing process crashed while running within a computing environment, wherein the telemetry data:
        is related to the computing process that crashed while running within the computing environment; and
        comprises a crash dump, a call stack of the computing environment, and a trace of an application program interface called by the computing process;
    searching the telemetry data at the server for evidence of any vulnerabilities that potentially led the computing process to crash while running within the computing environment on the computing device;
    identifying, while searching the telemetry data at the server, evidence of a vulnerability of the computing process, wherein the evidence of the vulnerability comprises a pattern identified across the telemetry data that indicates that:
        the call stack included an exception handler of the computing process and overflowed while the computing process was running within the computing environment; and
        the exception handler of the computing process was overwritten as a result of the call stack overflowing;

determining, by the server, that the vulnerability represents a zero-day vulnerability that is not yet known to exist within the computing process by:
  querying a database that includes a running list of vulnerabilities known to affect certain computing processes; and
  determining, based at least in part on the query, that the database does not identify the computing process as having the vulnerability; and
in response to identifying the evidence of the computing process's vulnerability and determining that the vulnerability represents a zero-day vulnerability that is not yet known to exist within the computing process, performing at least one security action to hinder any potentially malicious exploitation of the computing process's vulnerability.

2. The method of claim 1, wherein logging the telemetry data comprises at least one of:
creating a crash dump;
recording a call stack of the computing environment;
tracing at least one API called by the computing process; and
identifying which call stack of the computing environment was involved in the crash of the computing process.

3. The method of claim 1, further comprising determining that the computing process crashed while running within the computing environment by detecting the overflow of the call stack within the computing environment while the computing process is running within the computing environment.

4. The method of claim 1, wherein identifying the evidence of the computing process's vulnerability further comprises determining, based at least in part on the telemetry data, that a virtual address of the computing process on the call stack within the computing environment was overwritten while the computing process was running within the computing environment.

5. The method of claim 1, wherein performing the security action in response to identifying the evidence of the computing process's vulnerability comprises at least one of:
notifying a vendor of the computing process about the computing process's vulnerability;
adding a record of the computing process's vulnerability to a database that identifies known vulnerabilities of certain computing processes; and
modifying a computer security system to monitor for any attempts to exploit the computing process's vulnerability.

6. The method of claim 1, further comprising monitoring the computing environment on the computing device by logging the telemetry data with at least one of:
an Application Programming Interface (API) hook;
a packet capture component;
a file system monitor; and
a network switch.

7. The method of claim 6, wherein logging the telemetry data with the API hook comprises at least one:
inserting a hook within an API that is commonly called during malicious attacks; and
inserting a hook within a code path that leads to an API that is commonly called during malicious attacks.

8. A system for detecting unknown vulnerabilities in computing processes, the system comprising:
a monitoring module, stored in memory, that:
  obtains telemetry data from a computing device on which a computing process crashed while running within a computing environment, wherein the telemetry data:
    is related to the computing process that crashed while running within the computing environment; and
    comprises a crash dump, a call stack of the computing environment, and a trace of an application program interface called by the computing process;
an analysis module, stored in memory, that:
  searches the telemetry data for evidence of any vulnerabilities that potentially led the computing process to crash while running within the computing environment on the computing device;
  identifies, while searching the telemetry data, evidence of a vulnerability of the computing process, wherein the evidence of the vulnerability comprises a pattern identified across the telemetry data that indicates that:
    the call stack included an exception handler of the computing process and overflowed while the computing process was running within the computing environment; and
    the exception handler of the computing process was overwritten as a result of the call stack overflowing;
  determines that the vulnerability represents a zero-day vulnerability that is not yet known to exist within the computing process by:
    querying a database that includes a running list of vulnerabilities known to affect certain computing processes; and
    determining, based at least in part on the query, that the database does not identify the computing process as having the vulnerability;
a security module, stored in memory, that performs at least one security action to hinder any potentially malicious exploitation of the computing process's vulnerability in response to the identification of the evidence and the determination that the vulnerability represents a zero-day vulnerability that is not yet known to exist within the computing process; and
at least one physical processor that executes the monitoring module, the analysis module, and the security module.

9. The system of claim 8, wherein the monitoring module logs the telemetry data by at least one of:
creating a crash dump;
recording a call stack of the computing environment;
tracing at least one API called by the computing process; and
identifying which call stack of the computing environment was involved in the crash of the computing process.

10. The system of claim 8, wherein the monitoring module determines that the computing process crashed by detecting the overflow of the call stack within the computing environment while the computing process is running within the computing environment.

11. The system of claim 8, wherein the analysis module identifies the evidence of the computing process's vulnerability by determining, based at least in part on the telemetry data, that a virtual address of the computing process on the call stack within the computing environment was overwritten while the computing process was running within the computing environment.

12. The system of claim 8, wherein the monitoring module logs the telemetry data with at least one of:
   an Application Programming Interface (API) hook;
   a packet capture component;
   a file system monitor; and
   a network switch.

13. The system of claim 12, wherein the monitoring module logs the telemetry data with the API hook by at least one:
   inserting a hook within an API that is commonly called during malicious attacks; and
   inserting a hook within a code path that leads to an API that is commonly called during malicious attacks.

14. A non-transitory computer-readable medium comprising one or more computer-executable instructions that, when executed by at least one processor of a server, cause the server to:
   obtain, by the server, telemetry data from a computing device on which a computing process crashed while running within a computing environment, wherein the telemetry data:
      is related to the computing process that crashed while running within the computing environment; and
      comprises a crash dump, a call stack of the computing environment, and a trace of an application program interface called by the computing process;
   search the telemetry data at the server for evidence of any vulnerabilities that potentially led the computing process to crash while running within the computing environment on the computing device;
   identify, while searching the telemetry data at the server, evidence of a vulnerability of the computing process, wherein the evidence of the vulnerability comprises a pattern identified across the telemetry data that indicates that:
      the call stack included an exception handler of the computing process and overflowed while the computing process was running within the computing environment; and
      the exception handler of the computing process was overwritten as a result of the call stack overflowing;
   determine, by the server, that the vulnerability represents a zero-day vulnerability that is not yet known to exist within the computing process by:
      querying a database that includes a running list of vulnerabilities known to affect certain computing processes; and
      determining, based at least in part on the query, that the database does not identify the computing process as having the vulnerability; and
   perform at least one security action to hinder any potentially malicious exploitation of the computing process's vulnerability represents a zero-day vulnerability that in response to identifying the evidence of the computing process's vulnerability and determining that the vulnerability is not yet known to exist within the computing process.

* * * * *